(12) United States Patent
Shimizu

(10) Patent No.: US 6,175,918 B1
(45) Date of Patent: Jan. 16, 2001

(54) CLIENT COMPUTER, INITIALIZATION PROCESSING METHOD APPLIED TO CLIENT COMPUTER, AND COMPUTER PROGRAM PRODUCT USED IN CLIENT COMPUTER

(75) Inventor: Nobuo Shimizu, Tokyo (JP)

(73) Assignee: Kabushiki Kaisha Toshiba, Kawasaki (JP)

( * ) Notice: Under 35 U.S.C. 154(b), the term of this patent shall be extended for 0 days.

(21) Appl. No.: 09/128,940

(22) Filed: Aug. 5, 1998

(30) Foreign Application Priority Data

Aug. 11, 1997 (JP) .................................... 9-216733

(51) Int. Cl.$^7$ .................................... G06F 9/445
(52) U.S. Cl. .................................... 713/1; 709/222
(58) Field of Search .................................... 713/1, 2, 100; 714/3, 4; 709/203, 208, 209, 217, 219, 220–222, 226

(56) References Cited

U.S. PATENT DOCUMENTS

| | | | |
|---|---|---|---|
| 5,568,612 | * 10/1996 | Barrett et al. | 709/203 |
| 5,647,056 | * 7/1997 | Barrett et al. | 709/220 |
| 5,862,052 | * 1/1999 | Nixon et al. | 713/1 |
| 5,978,912 | * 11/1999 | Rakavy et al. | 713/2 |

* cited by examiner

*Primary Examiner*—Thomas M. Heckler
(74) *Attorney, Agent, or Firm*—Finnegan, Henderson, Farabow, Garrett, & Dunner, L.L.P.

(57) ABSTRACT

An initialization processing program in an OS downloaded from a server computer to a client computer and executed includes an operation mode selection processing function of selecting one of a network operation mode designed to use a LAN and a disconnected operation mode designed to use a local storage in the login of the client computer, and setting an operation environment corresponding to the selected mode. The operation mode can be changed in accordance with whether the use environment is a mobile or office environment. A client computer suitable for use in the mobile environment can be realized.

36 Claims, 10 Drawing Sheets

FIG. 6
FIG. 7
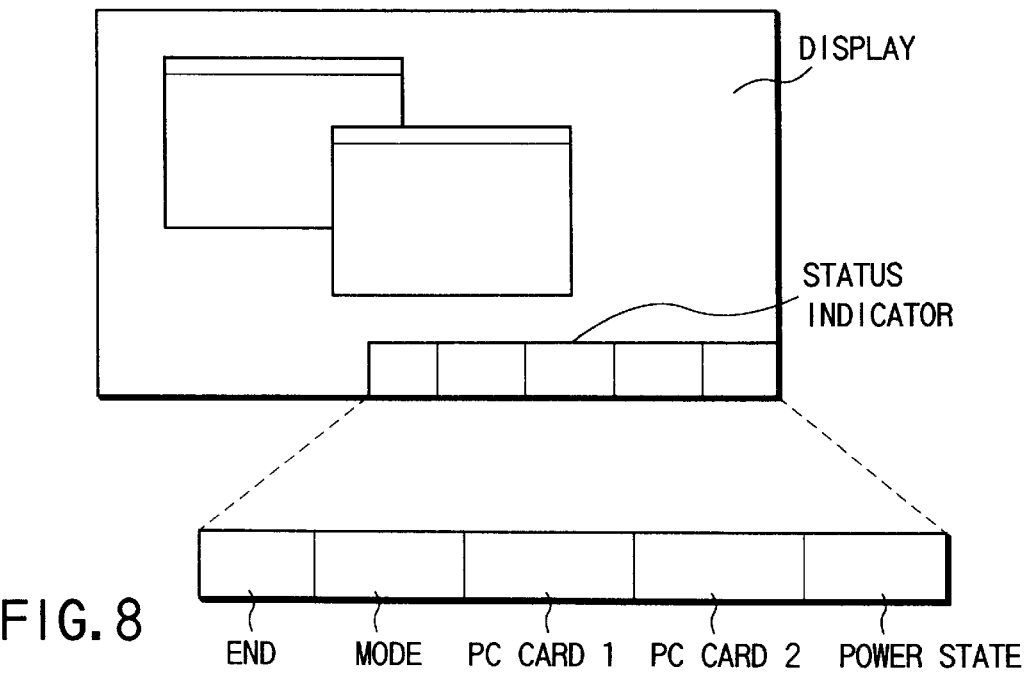
FIG. 8

OFFICE MODE (LAN & DAY PACK MODE)

OFFICE MODE (LAN MODE)

MOBILE MODE (DAY PACK MODE)

MOBILE MODE (PPP & DAY PACK MODE)

FIG. 12

START USING DAY PACK

ENTER DAY PACK PASSWORD

DAY PACK PASSWORD: ☐

CONFIRMATION
PASSWORD: ☐

[OK]  [CANCEL]

FIG. 13

MOBILE MODE (DAY PACK MODE)

OPERATION MODE:MOBILE MODE

◆DAY PACK  [OK]

DIAL-UP CONNECTION?  [YES]

FIG. 14

MOBILE MODE (PPP & DAY PACK MODE)

OPERATION MODE:MOBILE MODE

◆DIAL-UP

◆DAY PACK  [OK]

IS SYNCHRONIZATION MADE BETWEEN DAY PACK AND DATA ON SERVER?  [YES]

DIAL-UP DISCONNECTION?  [YES]

CLIENT COMPUTER, INITIALIZATION PROCESSING METHOD APPLIED TO CLIENT COMPUTER, AND COMPUTER PROGRAM PRODUCT USED IN CLIENT COMPUTER

BACKGROUND OF THE INVENTION

The present invention relates to a client computer which downloads programs and data necessary for data processing from a server computer (server) via a network, an initialization processing method applied to the client computer, and a computer program product used in the client computer.

This application is based on Japanese Patent Application No. P09-216733 filed on Aug. 11, 1997, the content of which is incorporated herein by reference.

In recent years, new computer architectures called network computers are being developed instead of personal computers.

The network computer is designed to use a network. Resources such as programs and data necessary for data processing are downloaded from a server via the network. For this reason, each client computer functioning as a network computer need not have programs and data and can flexibly cope with, e.g., updating of an Operating System (OS) and application programs. As a result, total cost of ownership can be drastically reduced.

However, when the client computer is used as a mobile device, it must be connected to the network such as a public network. This results in high communication cost.

More specifically, to use the client computer in a mobile environment where the computer is disconnected to the network, the client computer must remote-access the server via a public network whenever programs and data are downloaded, or a file is updated. Consequently, the processing speed of the client computer decreases, and the communication cost increases.

As described above, a conventional client computer is unsuitable for use in the mobile environment. Using the client computer in the mobile environment, higher communication cost is required due to remote-access to the server. The processing speed decreases by the time required for remote-access.

BRIEF SUMMARY OF THE INVENTION

It is the first object of the present invention to provide a client computer suitable for mobile usage which can be used by selectively switching between an operation mode in which the client computer does not access the server and an operation mode in which the client computer accesses the server, in accordance with a use environment or the like.

It is the second object of the present invention to provide an initialization processing method applied to the client computer.

It is the third object of the present invention to provide a computer program used in the client computer.

The first object is achieved by the following client computer. That is, the client computer downloads a program and data necessary for data processing from a server computer via a network and operates in a first operation mode while accessing the server computer connected to a LAN (Local Area Network) or in a second operation mode while accessing the server computer via a network, comprising operation mode selection means for selecting one of the first and second operation modes at the time of initialization processing in accordance with a use environment of the client computer or a user instruction made by designating in a displayed mode selection menu, and means for controlling an operation of the client computer in the operation mode selected by the operation mode selection means.

The second object is achieved by the following initialization processing method applied to the client computer. That is, the initialization processing method of the present invention comprises a step of selecting one of the first and second operation modes at the time of initialization processing in accordance with one of a use environment of the client computer or a user instruction made by designating in a displayed mode selection menu and a step of controlling an operation of the client computer in the selected operation mode.

The third object is achieved by the following computer program product used in the client computer. That is, the computer program product of the present invention comprises computer readable program code means for causing the client computer to select one of the first and second operation modes in accordance with a use environment of the client computer or a user instruction made by designating in a displayed mode selection menu at the time of initialization processing, and computer readable program code means for causing the client computer to control an operation of the client computer in the selected operation mode.

In the present invention, in order to apply the client computer to mobile usage, the second operation mode in which the client computer can operate accessing server via a network is prepared as a new operation mode.

The second operation mode or a general network operation mode (first operation mode) in which the client computer operates while accessing the server connected to a LAN must be selected at the time of initialization processing of the client computer. For this purpose, according to the present invention, the function for selecting one of the first operation mode requiring a LAN environment and the second operation mode requiring a network environment is set in an OS initialization processing routine. The two modes can be selectively switched in accordance with the use environment or a user instruction in the login of the client computer.

The local storage device for storing the program and data downloaded from the server is arranged in the client computer. The client computer can operate without accessing the server by using the local storage device.

With this arrangement, different operation modes can be used in accordance with, e.g., a LAN usable environment and an unusable environment. A client computer suitable for mobile usage can be realized.

The client computer can display a mode selection menu for causing a user to select an operation mode to be used at the time of initialization processing of the client computer, and the operation mode can be selected from a displayed mode selection menu.

At the time of initialization processing of the client computer, whether the client computer is connected to the LAN may be checked, the operation mode may be selected on the basis of the determination result, and the selected operation mode may be presented to the user as a default mode on the displayed mode selection menu. When the default mode is presented, an operation mode intended by the user can be automatically predicted, and user operation in login processing can be simplified.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments give below, serve to explain the principles of the invention

FIG. 6 is a view showing a login dialog box displayed at the time of the login of the client computer according to this embodiment;

FIG. 7 a view showing an example of a display used in login authentication processing of the client computer according to this embodiment;

FIG. 8 is a view for explaining a status indicator used in the client computer according to this embodiment;

FIGS. 9A to 9D are views each showing an example of mode indicators included in the status indicator in FIG. 8, in which FIG. 9A shows an indicator of the office mode, LAN & Day Pack mode, FIG. 9B shows an indicator of the office mode, LAN mode, FIG. 9C shows indicator of the mobile mode, Day Pack mode, and FIG. 9D shows an indicator of the mobile mode, PPP & Day Pack mode;

FIG. 12 is a view showing a dialog box displayed when the mode shifts from the LAN mode to the LAN & Day Pack mode using the dialog in FIG. 11;

FIG. 13 is a view showing a dialog box for the Day Pack mode of the mobile mode used in the client computer according to this embodiment;

FIG. 14 is a view showing a dialog box for the mobile mode PPP & Day Pack mode of the mobile mode used in the client computer according to this embodiment;

DETAILED DESCRIPTION OF THE INVENTION

An embodiment of the present invention will be described below with reference to the several views of the accompanying drawings.

Figure 1:
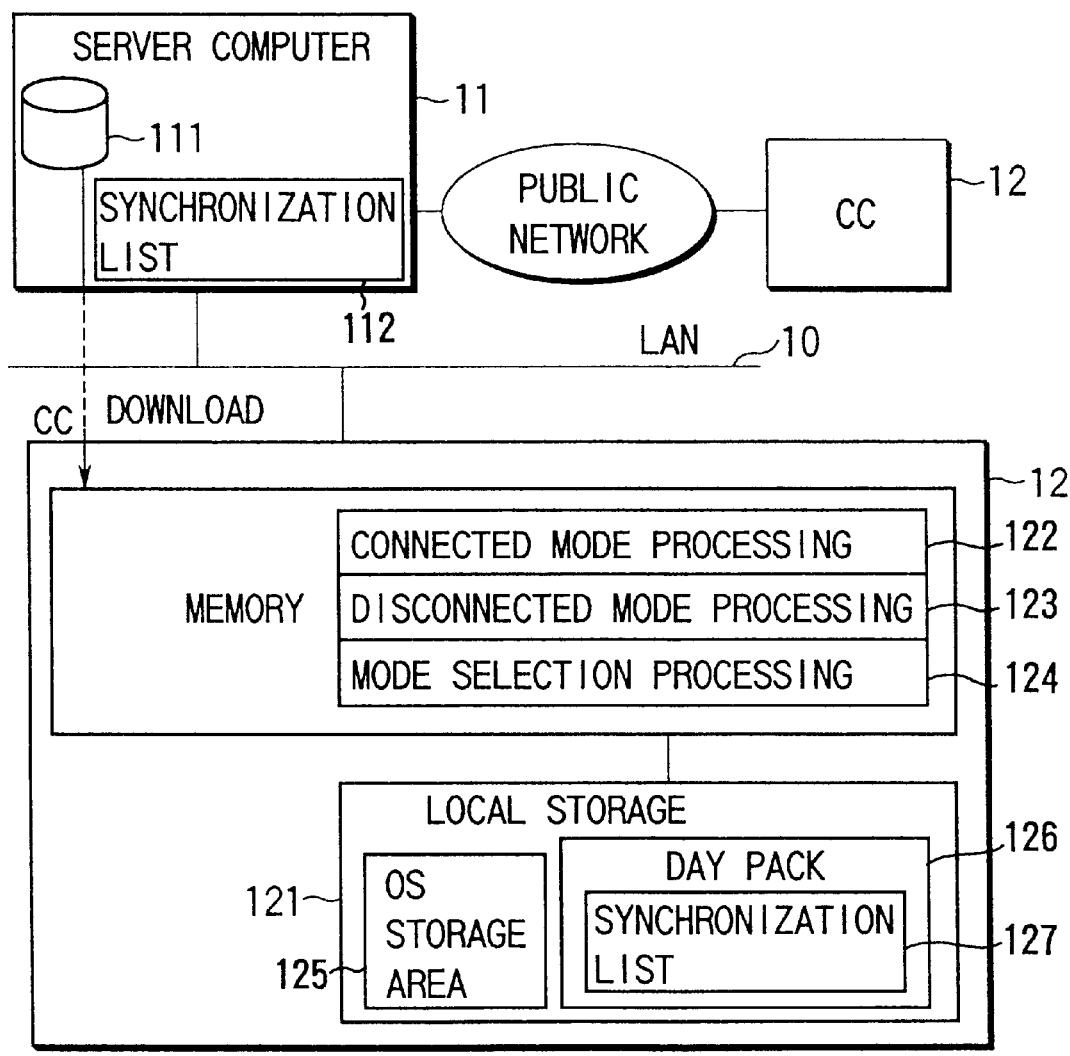
FIG. 1 is a block diagram showing an example of an arrangement using a client computer system according to an embodiment of the present invention.

FIG. 1 shows an example of an arrangement using a client computer system according to an embodiment of the present invention.

A client computer (CC) 12 operates upon downloading all programs and data such as an Operating System (OS) and application programs necessary for data processing from a server computer (server) 11 via a LAN 10 or a network such as a public network. The client computer (CC) 12 may be called a network computer.

In the office, the client computer (CC) 12 is used by connecting to the LAN 10 (office mode).

Outside the office, the client computer (CC) 12 is basically disconnected from the server 11 (mobile mode), but can be used by remotely connecting to the server 11 via a network, as needed.

The server 11 provides resources such as programs and data to each client computer (CC) 12 operating as a client machine. These resources are stored and managed by a hard disk drive 111 of the server 11.

The client computer (CC) 12 comprises a local storage device 121 so as to operate in a disconnected operation mode in which the client computer 12 is not connected to a network. A part of programs and data downloaded from the server 11 are stored in the local storage 121. In the disconnected operation mode, by using the programs and data stored in the local storage 121, the client computer (CC) 12 can operate without connecting to the server 11. A flash memory card or a hard disk drive is used as a nonvolatile storage device for the local storage 121.

A connected mode processing function 122 and a disconnected mode processing function 123 are prepared for the OS downloaded from the server 11 to the client computer (CC) 12.

The connected mode processing function 122 is a processing function for controlling the client computer (CC) 12 in a network operation mode in which the client computer (CC) 12 operates by accessing the server 11. The disconnected mode processing function 123 is a processing function for controlling the client computer (CC) 12 in a disconnected operation mode in which the client computer (CC) 12 operates without accessing the server 11.

An initialization processing program in the OS includes an operation mode selection processing function 124 for selecting either the network operation mode or the disconnected operation mode at the time of login of the client computer (CC) 12, and arranging an operation environment corresponding to the selected mode.

The network operation mode and the disconnected operation mode will be explained in detail below.

The disconnected operation mode is designed for use of the local storage 121 for storing all programs and data such as an OS and application programs of the server 11 necessary for data processing. The local storage 121 comprises an OS storage area 125 where the copy of the OS is stored, and a storage area called a "Day Pack" 126 where a synchronization list 127 is recorded. The Day Pack 126 is a storage area of the local storage 121 for programs and data necessary for operating the client computer (CC) 12 in the disconnected operation mode.

If programs and data necessary to use the client computer (CC) 12 in the disconnected operation mode are downloaded from the server 11 to the Day Pack 126 in advance, the work performed in the network operation mode can be continuously performed even after the mode shifts to the disconnected operation mode. The programs downloaded to the Day Pack 126 in advance are, e.g., document viewer programs such as a WWW browser program, and personal information management software programs including an electronic mail program, a wordprocessor program, and a scheduler program.

Also in the network operation mode, the Day Pack 126 may be used to prefetch programs and data in preparation for the shift to the disconnected operation mode. Accordingly, the following five access modes are conceivable for the client computer (CC) 12 having the disconnected operation function.

Office Mode
  (1) LAN & Day Pack mode
  (2) LAN mode (not using Day Pack)
Mobile Mode
  (3) Day Pack mode
  (4) PPP & Day Pack mode
  (5) PPP mode (not using Day Pack)

In the office, modes (1) and (2) can be used. Outside the office, modes (3) to (5) can be used. In general, however, modes (3) and (4) are used, and mode (5) is not used due to the reason described below. As a result, the client computer (CC) 12 practically has four access modes (1) to (4).

Figure 2:
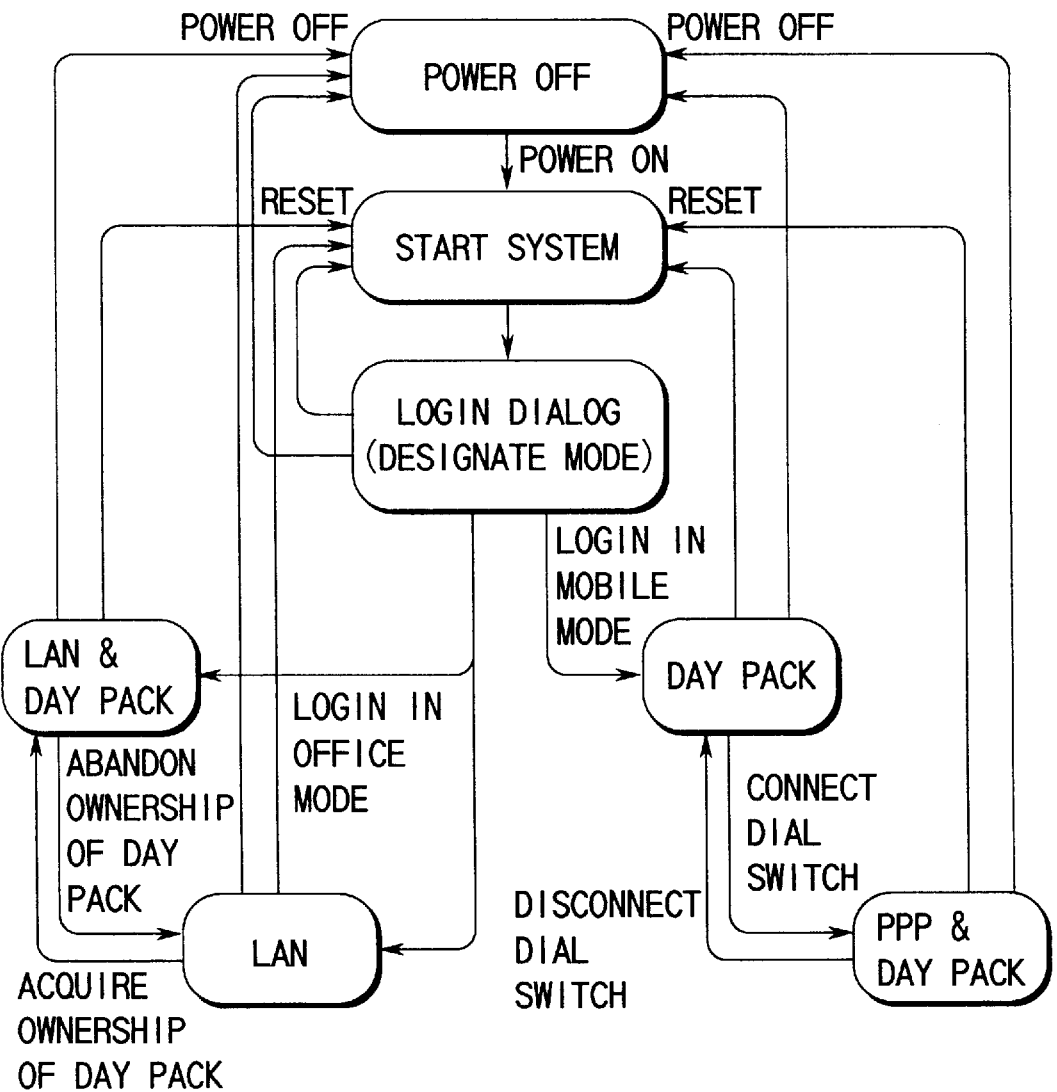
FIG. 2 is a flow chart showing the shift of the operation mode of the client computer according to this embodiment.

FIG. 2 shows the shift to these access modes.

When the client computer (CC) 12 is turned on from an OFF state or reset in an ON state, initialization processing by the OS starts (system starts). In login processing for causing the client computer (CC) 12 to obtain resources necessary for the operation from the server 11, a login dialog is displayed on the screen of the client computer (CC) 12, and an operation mode to be used is selected on the login dialog. The operation mode to be used is roughly divided into the "office mode" and the "mobile mode" described above.

The "office mode" is designed for the network computer used in the office where the LAN can be used, and corresponds to the above-mentioned network operation mode. When the "office mode" is selected, the LAN mode or the LAN & Day Pack mode is set as an access mode.

The "mobile mode" is designed for the network computer used outside the office where LAN can not be used, and corresponds to the above disconnected operation mode. When the "mobile mode" is selected, the Day Pack mode or the PPP & Day Pack mode is set as an access mode.

A mechanism for selecting and shifting between these modes is incorporated in the OS initialization processing.

The access mode will be described in detail below.
(a) Use of Day Pack in LAN Mode When a Day Pack 126 whose ownership is held by the user exists in the LAN mode, the LAN & Day Pack mode is automatically set. The access mode does not shift to the LAN mode as far as the Day Pack 126 whose ownership is held by the user exists.

In the LAN mode, the user can acquire or abandon the ownership of the Day Pack 126.

① Abandonment of Ownership of Day Pack

In the LAN & Day Pack mode, the user can abandon the ownership of the Day Pack 126 at anytime. If the user abandons it, the access mode shifts to the LAN mode.

② Acquisition of Ownership of Day Pack

In the LAN mode, if a Day Pack 126 whose ownership is not held by anyone exists, the user can acquire the ownership of the Day Pack 126. If the user acquires it, the access mode shifts to the LAN & Day Pack mode.
(b) Use of PPP in Day Pack Mode In the Day Pack mode, the user can start using the PPP (Point to Point Protocol) at anytime. If the user starts using it, the access mode shifts to the PPP & Day Pack mode.

To the contrary, in the PPP & Day Pack mode, the user can stop using the PPP at anytime. If the user stops using it, the access mode shifts to the Day Pack mode. When the PPP is used, the client computer (CC) 12 is connected to the server 11 via a network such as a public network, for example, a telephone network or a portable telephone network.
(c) Use of PPP Mode The PPP mode (not using Day Pack) is not used.

To shift the connection mode to the PPP mode, the client computer must be PPP-connected. For this purpose, the user must directly input various setting information necessary for dial-up.

On the other hand, in the PPP & Day Pack. mode, various setting information necessary for dial-up can be stored in the Day Pack 126 because this mode shifts from the Day Pack mode. This information can be stored in the server 11 in advance.

Considering mobile usage, no problem arises if the use of the PPP is limited to using the Day Pack 126.
(d) Shift of Mode in Login In login, the user selects either the office mode or the mobile mode as an operation mode.

When the user selects the office mode, the LAN & Day Pack mode is set as an access mode if a Day Pack 126 whose ownership is held by the user exists, otherwise the LAN mode is set as a communication mode if no Day Pack 126 whose ownership is held by the user exists.

When the user selects the mobile mode, the Day Pack mode is set as a connection mode. The Day Pack mode can be shifted to the PPP & Day Pack mode by starting the use of the PPP.
(e) Reset and Power-Off In all the modes, the network computer can be reset and turned off. The "reset" means to initialize the data section of the OS and execute a system initialization routine. The "power-off" means to turn off the hardware power supply.

The operation in each access mode will be described.

Figure 3:
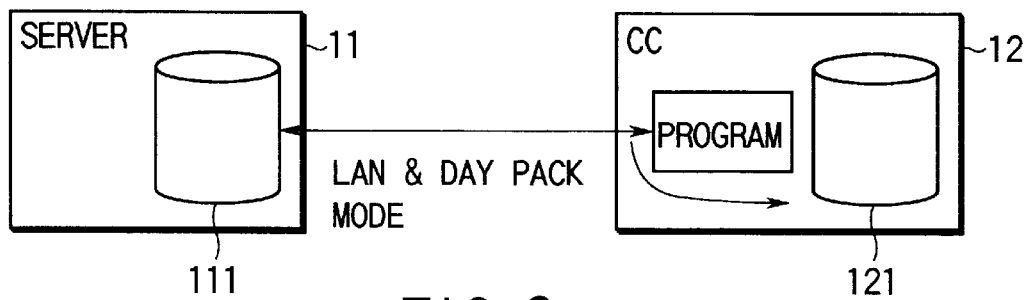
FIG. 3 is a view for explaining a LAN & Day Pack mode applied to the client computer according to this embodiment.

FIG. 3 shows the state of the LAN & Day Pack mode.

In this state, data in the server 11 is each operation object downloaded by a program from the server 11 to the client computer 12 and executed.

"Read" (read data) and "Write" (write data) mean read data in the server 11 and write data in the server 11 respectively.

"Create" (create a file) and "Delete" (delete a file) mean Create a file in the server 11 and Delete a file in the server 11 respectively.

"Mkdir" (create a directory) and "rmdir" (delete a directory) mean Create a directory in the server 11 and delete a directory in the server 11 respectively.

When data is written in the file in the server 11 designated by a synchronization list held by the client computer 12 and downloaded from the server 11 to the Day Pack 126, the data is also simultaneously written in such a corresponding file in the Day Pack 126.

The synchronization list 112 is a file in which files subjected to data synchronization processing performed to maintain the data matching between the server 11 and the local storage 121 of the client computer 12 are described. The synchronization list 112 is stored in the server 11. Each user has two synchronization lists 127, composed of an administrator synchronization list (a synchronization list for an administrator) and a user synchronization list (a synchronization list for a user). The administrator describes a list of files which the administrator wants to give the user on the administrator synchronization list, whereas the user describes a list of files with which the user wants to synchronize on the user synchronization list. The synchronization list 112 on the server 11 is copied, and the copy is stored in the local storage 121 of the client computer 12 as a synchronization list 127 for the client computer 12.

Figure 4:
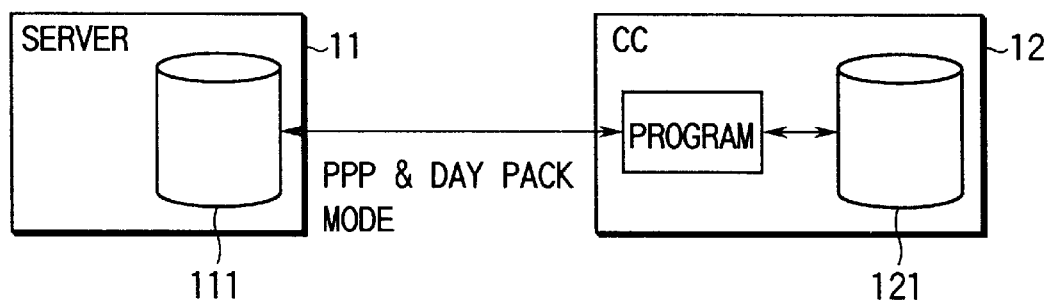
FIG. 4 is a view for explaining a PPP & Day Pack mode applied to the client computer according to this embodiment.

FIG. 4 shows the state of the PPP & Day Pack mode.

In this state, as for files registered in the synchronization list and designated, each operation object is data in the Day Pack. On the other hand, as for files not present in the synchronization list, each operation object is data on the server 11.

More Specifically, (1) as for files registered in the synchronization list,

Read and Write mean Read and Write data in the Day Pack respectively.

Create and Delete mean Create and Delete data in the Day Pack respectively.

Mkdir and Rmdir mean Create and delete of a directory in the Day Pack respectively.

(2) As for files not registered in the synchronization list,

Read and Write mean Read and Write of data on the server respectively.

Create and Delete mean Create and Delete data on the server.

Mkdir and Rmdir are Create and delete of a directory on the server.

Figure 5:
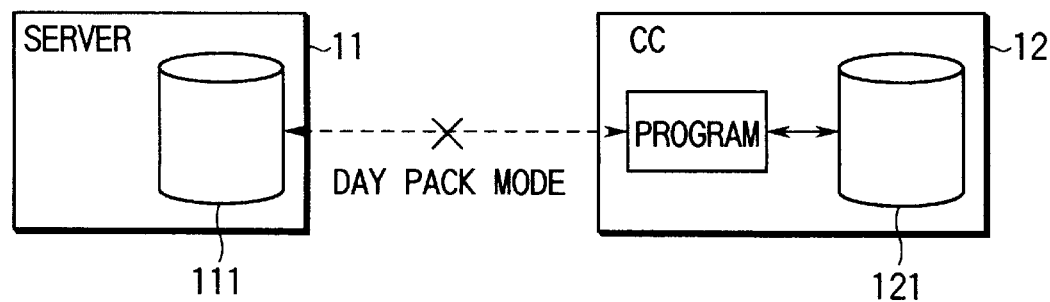
FIG. 5 is a view for explaining a Day Pack mode applied to the client computer according to this embodiment.

FIG. 5 shows the state of the Day Pack mode.

In this state, all operation objects are data in the Day Pack. That is,

Read and Write mean Read and Write data in the Day Pack.

Create and Delete mean Create and Delete data in the Day Pack.

Mkdir and Rmdir mean Create and delete of a directory in the Day Pack.

Note that Mkdir and Rmdir are performed only when a root directory is included in the synchronization list.

A login dialog used in selection processing of the mobile and office modes of the operation mode will be explained below.

FIG. 6 shows an example of a login dialog display used in this embodiment.

When the client computer 12 is turned on, an OS is read from the server 11 by a boot loader, and the system starts. If an OS is stored in the OS storage area 125 of the client computer 12, the OS is read, and the system starts. In the initialization processing of the OS, a login dialog box in FIG. 6 is displayed.

The default value of the operation mode is set as follows.

(1) When the Day Pack Whose Ownership is Set Exists:

First, the mobile mode is set as a default value.

At the same time, whether the client computer 12 is connected to the LAN 10 is checked. When the client computer 12 is connected to the LAN 10, the default value is changed to the office mode. The connection/disconnection to the LAN is determined, e.g., by broadcasting the DIS-COVER packet of the DHCP (Dynamic Host Configuration Protocol) and checking the presence/absence of the reception of an OFFER packet.

When the user explicitly selects the operation mode, this mode is set.

(2) When the Day Pack Does Not Exist or Ownership is Not Set in the Day Pack:

The office mode is set as a default value, and the mobile mode cannot be selected.

After the input of the login dialog is completed and the OK button is clicked, the following authentication processing is performed in accordance with an operation mode set in the login dialog.

(1) Mobile Mode

The user is authenticated by a Day Pack user name and password. If the authentication is successfully made, the first application starts and user operation starts. The Day Pack mode is set as an access mode.

When the client computer 12 is connected to server 11 via a network by dial-up, the PPP & Day Pack mode is set as an access mode.

If the authentication fails, an error dialog like the one in FIG. 7 is displayed. After the OK button is clicked, the display returns to the login dialog display.

(2) Office Mode

The user is authenticated by a login user name and password to the network. If the authentication is successfully made, the first application starts and user operation starts. In this case, when a Day Pack 126 whose ownership is held by the login user exists (a Day Pack 126 whose owner name coincides with the login user name exists), the LAN & Day Pack mode is set as an access mode. Otherwise, the LAN mode is set as an access mode. If the authentication fails, an error dialog like the one in FIG. 7 is displayed, similar to the mobile mode. After the OK button is clicked, the display returns to the login dialog display.

A status indicator will be described.

The status indicator is set on the display of the client computer 12 so that the operator can recognize the current mode (operation mode and access mode) during operation. The status indicator is in an icon area on the display, and can be moved with a mouse.

When the status indicator is clicked with the mouse, the dialog box opens, and the operator can instruct PPP connection/disconnection and ownership acquisition/abandonment of the Day Pack 126.

FIG. 8 shows an example of the display including the status indicator.

If the login is successfully made, the application starts and the operation mode shifts to a mode wherein the user can operate the client computer. At this time, the status indicator is displayed to display the current mode and the like. The status indicator is displayed as an icon at the lower right corner of the display as an initial position, and can be moved by dragging the icon with the mouse, as described above.

Icons like the ones shown in FIGS. 9A to 9D are displayed in a mode indicator area in accordance with an operation mode set in login and the current network access mode.

Figure 9A:
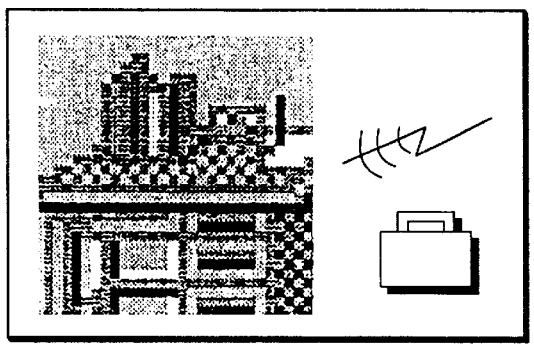
Figure 9B:
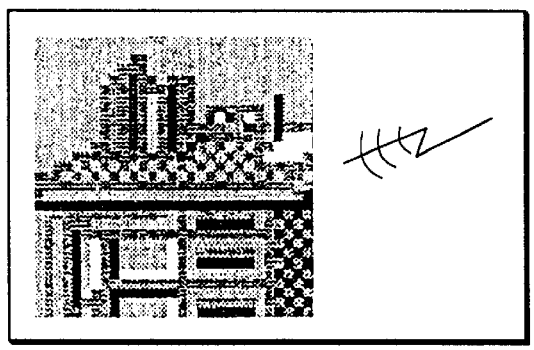
Figure 9C:
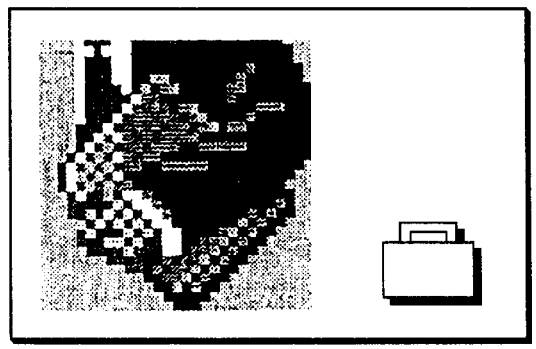
Figure 9D:
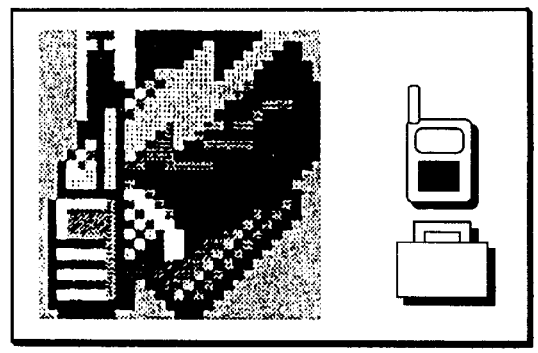

FIG. 9A shows an office mode icon (LAN & Day Pack mode icon), and FIG. 9B shows an office mode icon (LAN mode icon). FIG. 9C shows a mobile mode icon (Day Pack mode icon), and FIG. 9D shows a mobile mode icon (PPP & Day Pack mode icon).

If the user clicks the mode indicators in FIGS. 9A to 9D, the following dialogs are displayed.

Figure 10:
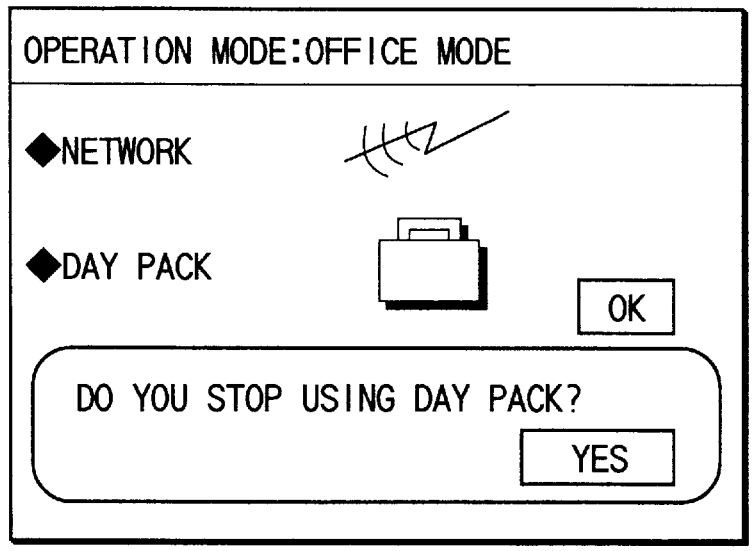
FIG. 10 is a view showing a dialog box for LAN & Day Pack mode of the office mode used in the client computer according to this embodiment.

A dialog box in FIG. 10 is displayed when the user clicks the mode indicator of the office mode (LAN & Day Pack mode). In this dialog box, the user can stop the use of the Day Pack 126, and the LAN & Day Pack mode can shift to the LAN mode.

Figure 11:
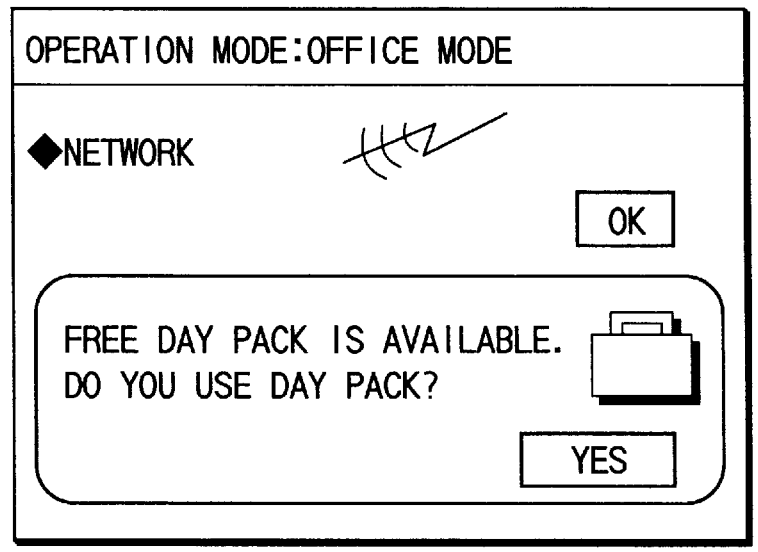
FIG. 11 a view showing a dialog box for the LAN mode of the office mode used in the client computer according to this embodiment.

A dialog box in FIG. 11 is displayed when the user clicks the mode indicator of the office mode (LAN mode). In this dialog box, when a Day Pack 126 whose ownership is not set exists, a message "There is a free Day Pack. Do you use the Day Pack?" is displayed, and the user can select the use of the Day Pack 126. If the user selects the use of the Day Pack 126, a dialog box in FIG. 12 is displayed and the user is prompted to input the password of the Day Pack 126.

A dialog box in FIG. 13 is displayed when the user clicks the mode indicator of the mobile mode (Day Pack mode). In this dialog box, the user can select dial-up connection, and if the user selects it, the Day Pack mode can shift to the mobile mode (PPP & Day Pack mode).

A dialog box in FIG. 14 is displayed when the user clicks the mode indicator of the mobile mode (PPP & Day Pack mode). In this dialog box, the user can select whether data in the Day Pack 126 is synchronized with data on the server 11, and disconnects the dial-up connection. If the user disconnects the dial-up connection, the PPP & Day Pack mode shifts to the mobile mode (Day Pack mode).

The flow of processing at the start of the OS will be described with reference to the flow chart in FIG. 15.

When the client computer 12 is turned on, or an operation for rebooting the client computer 12 is performed, a boot program stored in the ROM of the client computer 12 starts.

In step S101, the boot program in the ROM first checks whether an OS is stored in the local storage 121 made up of a flash memory or the like.

If YES in step S101, the OS is booted from the local storage 121 in step S102. If NO in step S101, the boot program in the ROM automatically acquires an OS name, an IP address, and a boot environment by the DHCP in step S103.

In step S104, the boot program downloads a boot loader from the server 11 by the TFTP (Trivial File Transfer Protocol) and transfers the control to the boot loader.

In step S105, the boot loader loads an OS from the server 11 by the NFS (Network File System) and boots the OS.

In step S106, OS initialization processing starts. In this initialization processing, automatic selection processing of a device to be used is performed, and the copy of the OS is stored in the local storage 121. The storage of the copy of the OS is performed only when no OS is stored in the local storage 121. Accordingly, the OS can be locally booted in the local storage 121 next time.

The automatic selection processing of a device to be used is processing for the case wherein a plurality of devices are prepared for accessing to the network by LAN or PPP.

For example, devices for accessing to the network are as follows.

(a) LAN device

① radio LAN card, ② built-in LAN card (b) PPP device

① FAX modem, ② COm port

For this purpose, in the OS initialization processing, the function of automatically selecting a device is provided. The priority is set for a plurality of devices in advance, and a usable device with a high priority is selected.

For example, the priority is set in advance as follows.

| (a) LAN device | Priority |
|---|---|
| (1) radio LAN card | high |
| (2) built-in LAN card | low |
| (b) PPP device | Priority |
| (1) FAX modem | high |
| (2) COM port | low |

When the radio LAN card with a high priority is disconnected, the built-in LAN card with a low priority is used.

Figure 16:
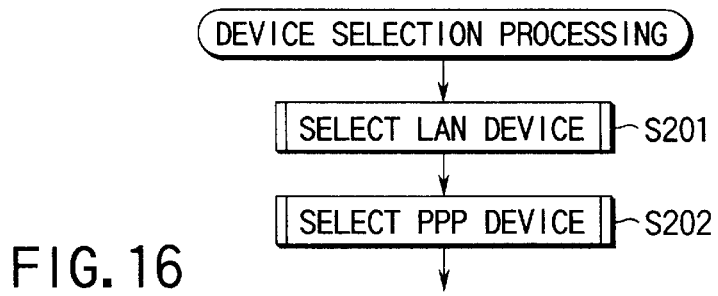
FIG. 16 is a flow chart showing the procedure of device selection processing executed in the OS start processing in FIG. 15.
Figure 17:
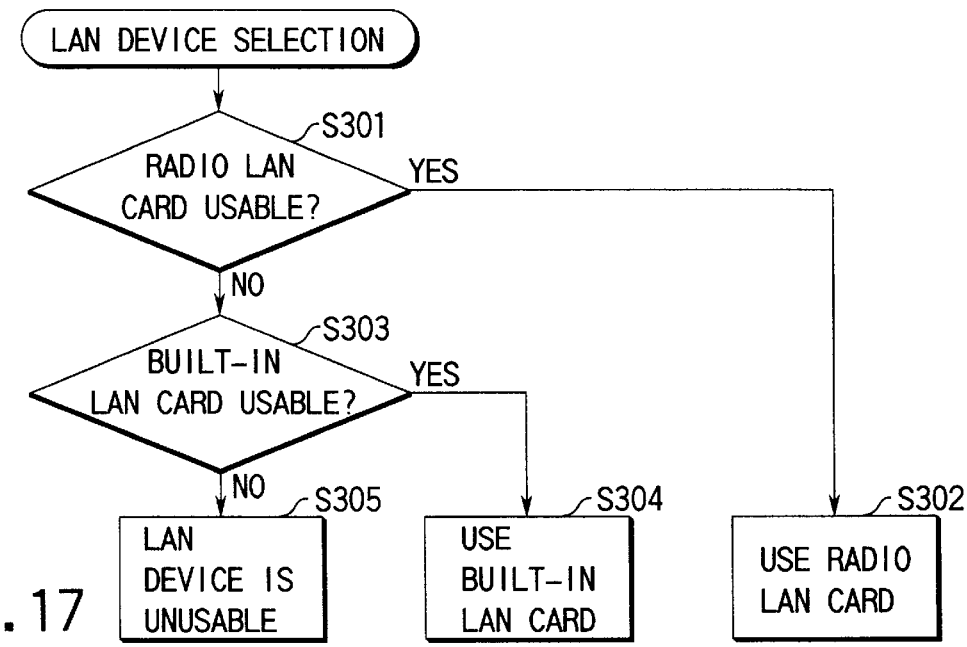
FIG. 17 is a flow chart showing the procedure of LAN device selection processing executed in the device selection processing FIG. 16.
Figure 18:
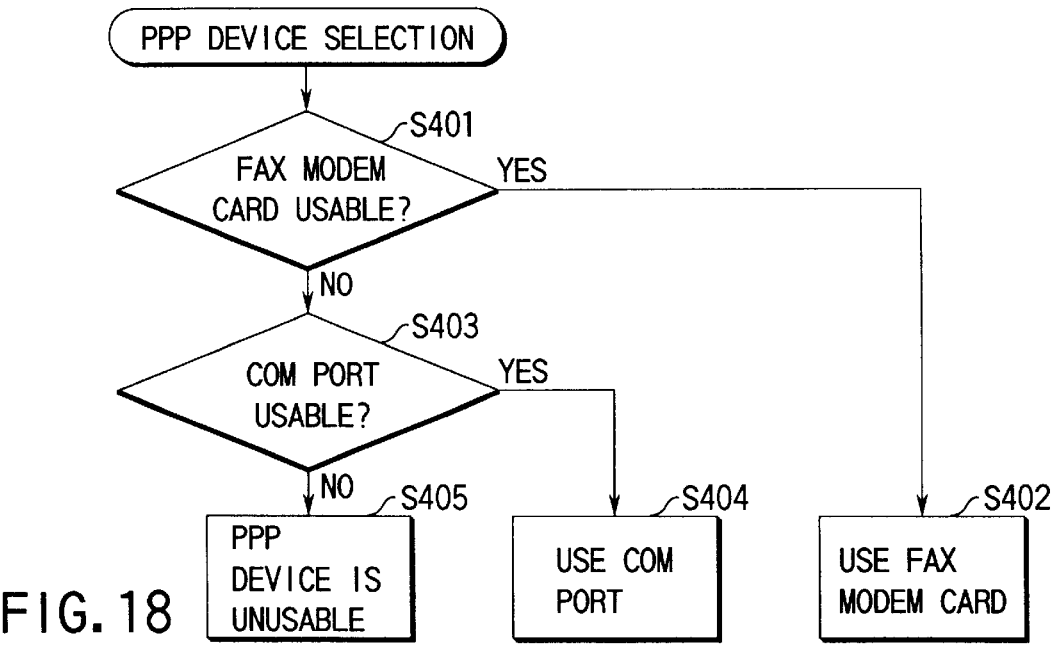
FIG. 18 is a flow chart showing the procedure of PPP device selection processing executed in the device selection processing in FIG. 16.

FIGS. 16 to 18 show the procedure of the device automatic selection processing using such priority.

As shown in FIG. 16, the device selection processing includes LAN device selection processing in step S201 and PPP device selection processing in step S202.

As shown in FIG. 17, in the LAN device selection processing in step S201, the OS checks in step S301 whether the radio LAN card can be used. If YES in step S301, the radio LAN card is installed as a device used for server access in step S302.

If NO in step S301, the OS checks in step S303 whether the built-in LAN card can be used. If YES in step S303, the built-in LAN card is installed as a device used for server access in step S304. If NO in step S303, the LAN device itself is set to be unavailable in step S305.

As shown in FIG. 18, in the PPP device selection processing in step S202 of FIG. 16, the OS checks in step S401 whether the FAX modem card can be used. If YES in step S401, the FAX modem card is installed as a device used for server access in step S402.

If NO in step S401, the OS checks in step S403 whether the COM port can be used. If YES in step S403, the COM port is installed as a device used for server access in step S404. If NO in step S403, the PPP device itself is set to be unavailable in step S405.

Upon completion of the use device selection processing, operation mode selection processing using the login dialog in FIG. 6 is performed.

Figure 15:
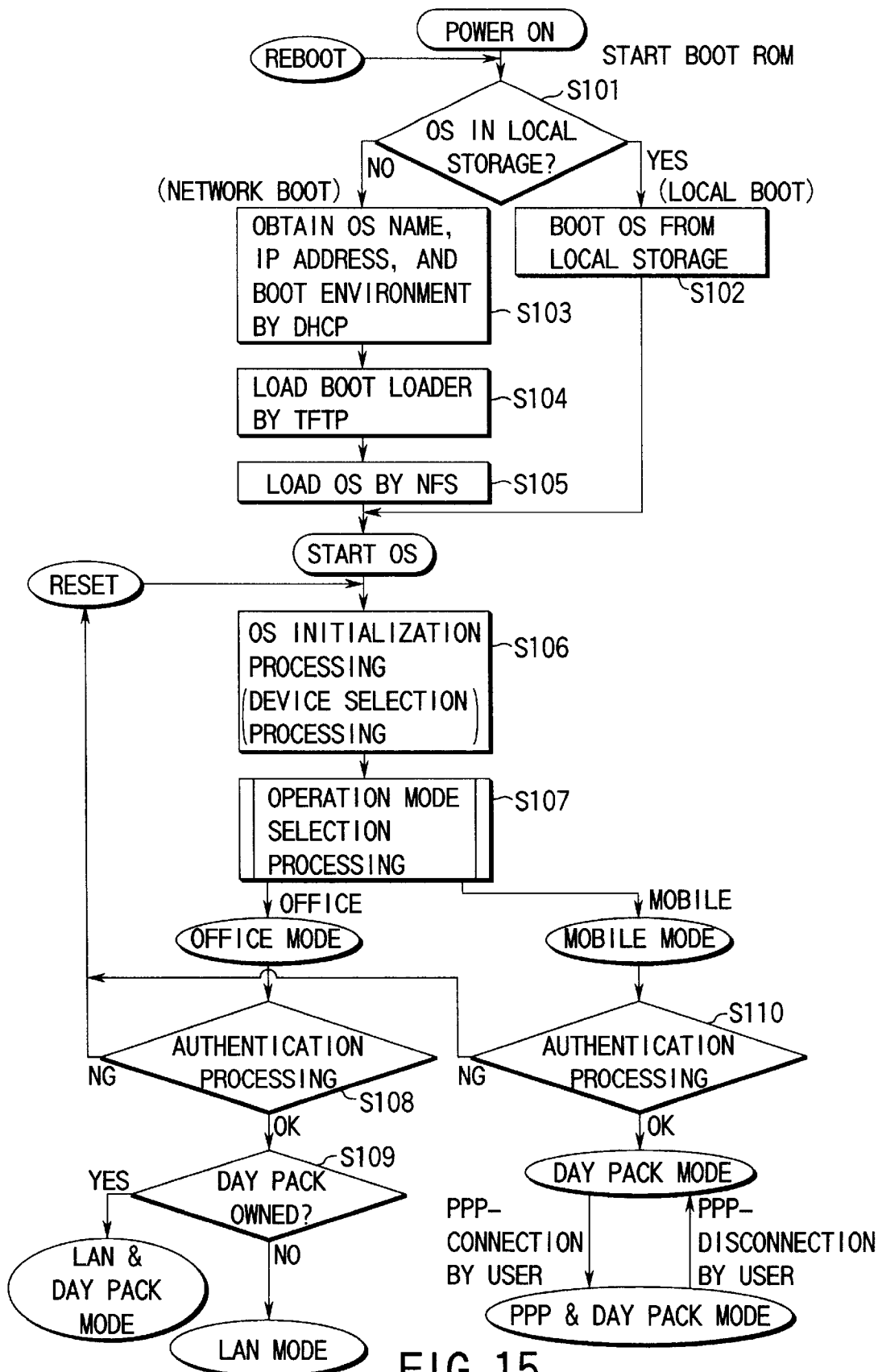
FIG. 15 is a flow chart showing the procedure of OS start processing applied to the client computer according to this embodiment.
Figure 19:
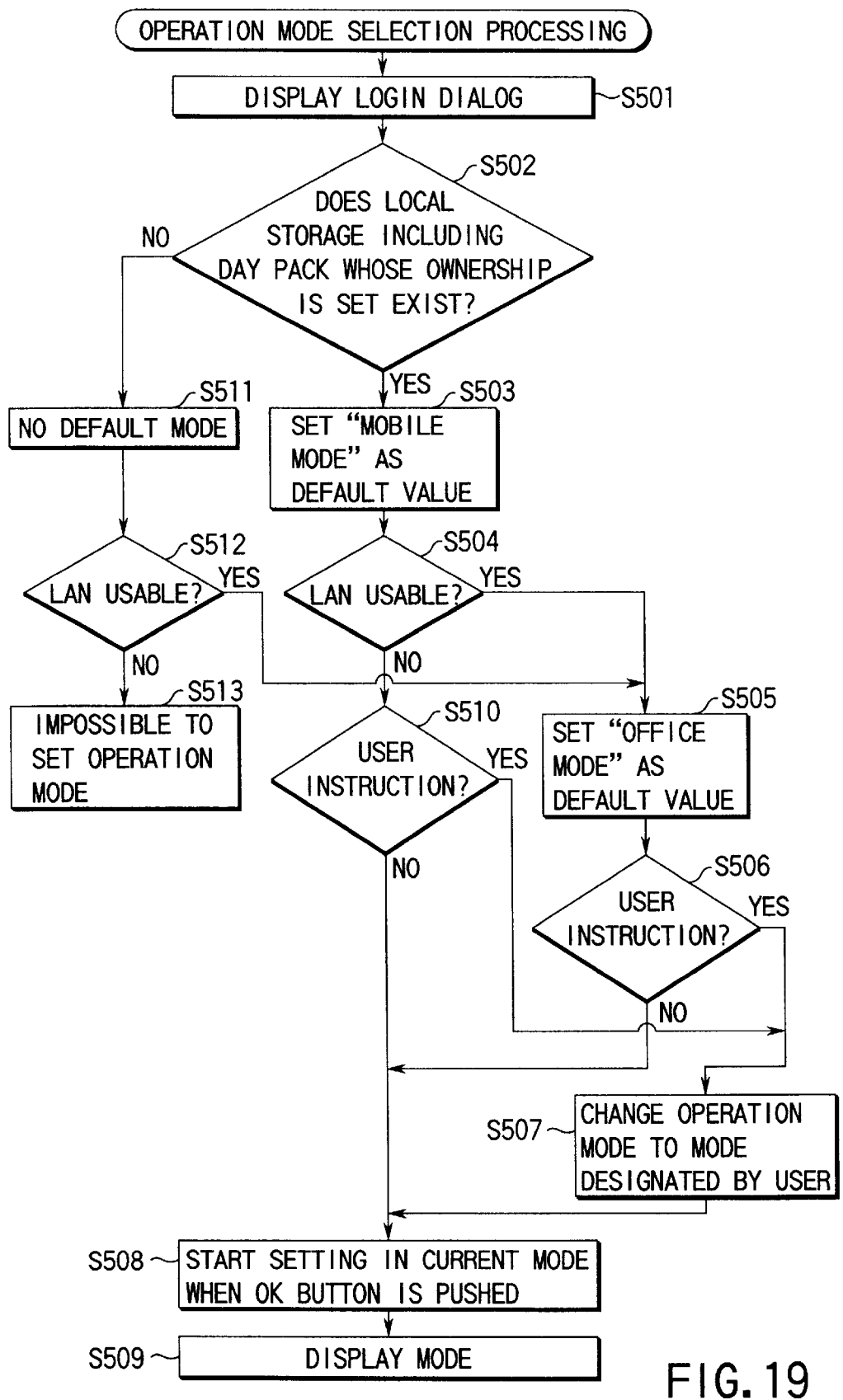
FIG. 19 is a flow chart showing the procedure of operation mode selection processing executed in the OS start processing in FIG. 15.

In the operation mode selection processing in step S107 of FIG. 15, the OS checks whether a Day Pack 126 whose ownership is set exists, and whether the LAN 10 can be used. The default value of the mode is determined on the basis of the determination results. The default value is displayed on the login dialog display. FIG. 19 shows a detailed processing procedure of the operation mode selection processing.

As shown in FIG. 19, in the login of the client computer 12, the login dialog display is displayed in step S501. In step S502, whether a local storage having a Day Pack 126 whose ownership is set exists is first checked. If YES in step S502, the mobile mode is set as a default value of the operation mode in step S503. In step S504, the DISCOVER packet of the DHCP is broadcast, and whether the LAN can be used is checked based on the presence/absence of the reception of an OFFER packet. If the OFFER packet is received, the environment is determined to be one where the LAN can be used. In step S505, the default value of the operation mode is changed to the office mode. In this manner, when the local storage having the Day Pack 126 whose ownership is set exists, the mobile or office. mode is displayed as a default value on the login dialog display in accordance with whether the LAN can be used.

If the user explicitly changes the setting of the mode on the login dialog display, the mode changes to the mode set by the user in step S506 or S510. In step S508, the user clicks the OK button on the login dialog display to confirm the current mode, and processing for setting the mode starts. In step S509, the indicator indicating the mode is displayed on the screen.

To the contrary, if no local storage exists, or no ownership is set in the Day Pack 126 though the local storage exists, whether the LAN can be used is checked in steps S511 and S512 while the default mode is undetermined. When the environment is determined to be one where the LAN can be used, the office mode is set as a default value of the operation mode, the default value is displayed on the login dialog display, and the mobile mode is invalidated in step S505. As described above, when no local storage exists, or no ownership is set in the Day Pack 126 though the local storage exists, the office mode is basically selected. If NO in step S512, the setting of the operation mode is determined in step S513 to be impossible.

When the operation mode is selected in the operation mode selection processing, user authentication processing is performed based on a user name, a password, and the like input on the login dialog in step S108 or S110 of FIG. 15. If the user authentication processing is successfully made, and the office mode is selected, the LAN mode or the LAN & Day Pack mode is set as an access mode on the basis of the presence/absence of the ownership of the Day Pack 126 in step S109. If the mobile mode is selected, the Day Pack mode or the PPP & Day Pack mode is set in accordance with PPP connection and disconnection operations by the user.

Note that the same effects as those of this embodiment can be obtained by using a computer program for executing initialization processing procedure in the client computer. This computer program can be stored in a recording medium such as a CD-ROM and distributed.

Additional advantages and modifications will readily occurs to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A client computer which operates upon downloading a program and data necessary for data processing from a server computer and which operates in one of a first operation mode accessing the server computer via a LAN and a second operation mode accessing the server computer via a public network, said client computer comprising:

operation mode selection means for selecting one of the first and second operation modes; and means for controlling an operation of the client computer in the operation mode selected by the operation mode selection means.

2. A client computer according to claim 1, further comprising a local storage device for storing at least a part of the program and data, which have been downloaded from the server computer.

3. A client computer according to claim 2, wherein the first operation mode includes a LAN-connection access mode in which the client computer accesses the server computer and a LAN-connection/local-storage access mode in which the client computer accesses the server computer and the local storage device and performs synchronization between data stored in the local storage device and data stored in the server computer.

4. A client computer according to claim 2, wherein the second operation mode includes a local-storage access mode in which the client computer accesses the local storage device and a network-connection/local-storage access mode in which the client computer accesses the server computer and the local storage device and performs synchronization between data stored in the local storage device and data stored in the server computer.

5. A client computer according to claim 2, wherein the operation mode selection means includes:

first means for determining whether a user has an ownership of the local storage device;

second means for determining whether the client computer is connected to the LAN; and third means for determining a default value of the operation mode to be used, in accordance with results obtained by the first and second means.

6. A client computer according to claim 5, wherein the operation mode selection means selects the first operation mode as a default value when the first means determines that the user has the ownership of the local storage device and the second means determines that the client computer is connected to the LAN.

7. A client computer according to claim 6, further comprising:

authenticating means for authenticating the user to use the local storage device; and means for setting the LAN-connection/local-storage access mode as the first operation mode when the authenticating means authenticates the user to use the local storage device.

8. A client computer according to claim 7, further comprising means for setting the LAN-connection access mode as the first operation mode when the authenticating means does not authenticate the user to use the local storage device.

9. A client computer according to claim 5, wherein the operation mode selection means selects the second operation mode as a default value when the first means determines that the user has the ownership of the local storage device and the second means determines that the client computer is not connected to the LAN.

10. A client computer according to claim 9, further comprising:

authenticating means for authenticating the user to use the local storage device; and means for setting the local-storage access mode as the second operation mode, when the authenticating means authenticates the user to use the local storage device.

11. A client computer according to claim 10, further comprising:

connection means for connecting to the public network by point-to-point protocol connection while the client computer remains in the local-storage access mode; and means for setting the network-connection/local-storage access mode as the second operation mode when the client computer is connected to the public network by the connection means.

12. A client computer according to claim 11, further comprising:

disconnection means for disconnecting from point-to-point protocol connection when the client computer is in the network-connection/local-storage access mode; and means for setting the local-storage access mode as the second operation mode when the client computer is disconnected from the public network by the disconnection means.

13. A client computer according to claim 1, further comprising:
- device selection means for assigning priorities to a plurality of devices to be provided in the client computer for connecting to the LAN or to the public network, and for selecting one of devices provided in the client computer on the basis of priority; and
- means for causing the client computer to access the server computer, by using the device selected by the device selection means.

14. A client computer which operates upon downloading a program and data necessary for data processing from a server computer and which operates in one of a first operation mode accessing the server computer via a LAN and a second operation mode accessing the server computer via a public network, said client computer comprising:
- operation mode selection means for selecting one of the first and second operation modes;
- means for controlling an operation of the client computer in the operation mode selected by the operation mode selection means; and
- indicator displaying means for displaying an indicator showing the operation mode selected by the operation mode selection means on a screen of the client computer.

15. A client computer according to claim 14, wherein the indicator displaying means has means for displaying a first icon representing the operation mode and a second icon showing a connection state of a communication device connected to the client computer.

16. A client computer which has a local storage device for storing at least a part of a program and data which have been downloaded from a server computer, and which operates in one of a first operation mode accessing the local storage device and without accessing the server computer and a second operation mode accessing the server computer said client computer comprising:
- means for loading an operating system from the local storage device or the server computer;
- means for displaying a mode selection menu for enabling a user to select the first operation mode or the second operation mode; and
- means for operating the client computer in the operation mode which the user has selected in the displayed mode selection menu.

17. A client computer according to claim 16, further comprising:
- first means for determining whether the client computer is connected to a LAN and whether the user has an ownership of the local storage device; and
- second means for determining a default value of the operation mode and displaying the mode selection menu, in accordance with results obtained by the first means.

18. A client computer which has a local storage device for storing at least a part of a program and data which have been downloaded from a server computer, and which operates in one of a first operation mode accessing the local storage device and without accessing the server computer and a second operation mode accessing the server computer, said client computer comprising:
- means for loading an operating system from the local storage device or the server computer;
- means for determining whether the client computer is connected to a LAN and whether a user has an ownership of the local storage device, and for selecting one of the first and second operation modes in accordance with whether the client computer is connected to the LAN and whether the user has the ownership of the local storage device;
- means for operating the client computer in the selected operation mode; and
- means for displaying an indicator representing the selected operation mode on a screen of the client computer.

19. A client computer which operates upon downloading a program and data necessary for data processing from a server computer to a local storage and which operates in one of a first operation mode accessing the server computer via a LAN and a second operation mode accessing the local storage, said client computer comprising:
- first determining means for determining whether a user has an ownership of the local storage device;
- second determining means for determining whether the client computer is connected to the LAN; and
- operation mode selection means for selecting one of the first and second operation modes in accordance with results of determinations obtained by said first and second determining means.

20. A method of initializing a client computer which operates upon downloading a program and data necessary for data processing from a server computer and which operates in one of a first operation mode while accessing the server computer via a LAN and a second operation mode while accessing the server computer via a public network, said method comprising:
- a step of selecting one of the first and second operation modes; and
- a step of controlling an operation of the client computer in the selected operation mode.

21. A method of initializing a client computer which operates upon downloading a program and data necessary for data processing from a server computer and which operates in one of a LAN-connection/local-storage access mode accessing the server computer via a LAN and accessing a local storage device provided in the client computer storing at least a part of the program and data downloaded from the server computer, a LAN-connection access mode accessing the server computer via the LAN, a network-connection/local storage access mode accessing the server computer via a public network and accessing the local storage device and a local storage access mode accessing the local storage device, said method comprising:
- a step of selecting one of the LAN-connection/local-storage access mode, LAN-connection access mode, network-connection/local-storage access mode, and local storage access modes; and
- a step of operating the client computer in the selected access mode.

22. A method according to claim 21, wherein the step of selecting one of the access modes includes:
- a first step of determining whether a user has an ownership of the local storage device;
- a second step of determining whether the client computer is connected to the LAN; and
- a third step of determining a default value of the access mode to be used, in accordance with results obtained in the first and second steps.

23. A method according to claim 22, further comprising:
- a step of authenticating the user to use the local storage device, after it is determined in the first step that the user has ownership of the local storage device and it is determined in the second step that the client computer is connected to the LAN; and a step of setting the client computer into the LAN-connection/local-storage access mode when the user is authenticated to use the local storage device.

24. A method according to claim 23, further comprising a step of setting the client computer into the LAN-connection access mode when the user is not authenticated to use the local storage device.

25. A method according to claim 22, further comprising:

a step of authenticating the user to use the local storage device, after it is determined in the first step that the user has ownership of the local storage device and it is determined in the second step that the client computer is not connected to the LAN; and a step of setting the client computer into the local-storage access mode, when the user is authenticated to use the local storage device.

26. A method according to claim 25, further comprising:

a step of connecting the client computer to the public network by point-to-point protocol connection while the client computer remains in the local-storage access mode; and a step of setting the client computer into the network-connection/local-storage access mode when the client computer is connected to the public network by point-to-point protocol connection.

27. A method according to claim 26, further comprising:

a step of disconnecting the client computer from point-to-point protocol connection while the client computer remains in the network-connection/local-storage access mode; and a step of setting the client computer into the local-storage access mode when the client computer is disconnected from the public network.

28. A method of initializing a client computer which operates upon downloading a program and data necessary for data processing from a server computer and which operates in one of a first operation mode accessing the server computer via a LAN and a second operation mode accessing the server computer via a public network, said method comprising:

a step of selecting one of the first and second operation modes;

a step of operating the client computer in the selected operation mode; and a step of displaying an indicator representing the selected operation mode on a screen of the client computer.

29. A method according to claim 28, wherein the step of displaying an indicator has a sub-step of displaying an icon representing the operation mode and an indicator showing a connection state of a communication device connected to the client computer.

30. A method of initializing a client computer which has a local storage device for storing at least a part of a program and data which have been downloaded from a server computer, and which operates in one of a first operation mode accessing the local storage device and without accessing the server computer and a second operation mode accessing the server computer, said method comprising:

a step of loading an operating system from the local storage device or the server computer;

a step of displaying a mode selection menu for enabling a user to select the first operation mode or the second operation mode; and a step of operating the client computer in the operation mode which the user has selected in the displayed mode selection menu.

31. A method according to claim 30, further comprising:

a first step of determining whether the client computer is connected to a LAN and whether the user has ownership of the local storage device at the time of initialization processing; and a second step of determining a default value of the operation mode and displaying the mode selection menu, in accordance with results obtained in the first step.

32. A method of initializing a client computer which has a local storage device for storing at least a part of a program and data which have been downloaded from a server computer, and which operates in one of a first operation mode accessing the local storage device and without accessing the server computer and a second operation mode accessing the server computer, said method comprising:

a step of loading an operating system from the local storage device or the server computer;

a step of determining whether the client computer is connected to a LAN and whether a user of the client computer has an ownership of the local storage device, and for selecting one of the first and second operation modes in accordance with whether the client computer is connected to the LAN and whether the user has the ownership of the local storage device;

a step of operating the client computer in the selected operation mode; and a step of displaying an indicator representing the selected operation mode, on a screen of the client computer.

33. A computer program product used in a client computer which operates upon downloading a program and data necessary for data processing from a server computer and which operates in one of a first operation mode while accessing the server computer via a LAN and a second operating mode while accessing the server computer via a public network said product comprising:

computer-readable program code means for causing the client computer to select one of the first and second operation modes; and computer-readable program code means for causing the client computer to control an operation of the client computer in the selected operation mode.

34. A computer program product used in a client computer which operates upon downloading a program and data necessary for data processing from a server computer and which operates in one of a LAN-connection/local-storage access mode accessing the server computer via a LAN and accessing a local storage device provided in the client computer storing at least a part of the program and data downloaded from the server computer, a LAN-connection access mode accessing the server computer via the LAN, a network-connection/local-storage access mode accessing the server computer via a public network and the local storage device, and a local storage access mode accessing the local-storage device, said product comprising:

computer-readable program code means for causing the client computer to select one of the LAN-connection/local-storage access mode, LAN-connection access mode, network-connection/local-storage access mode, and local storage access modes; and computer-readable program code means for causing the client computer to operate in the selected access mode.

35. A computer program product used in a client computer which operates upon downloading a program and data necessary for data processing from a server computer and which operates in one of a first operation mode accessing the server computer via a LAN and a second operation mode accessing the server computer via a public network, said product comprising:

computer-readable program code means for causing the client computer to select one of the first and second operation modes;

computer-readable program code means for causing the client computer to operate in the selected operation mode; and computer-readable program code means for causing the client computer to display an indicator representing the selected operation mode on a screen of the client computer.

36. A computer program product used in a client computer which has a local storage device for storing at least a part of a program and data which have been downloaded from a server computer, and which operates in one of a first operation mode accessing the local storage device and without accessing the server computer and a second operation mode accessing the server computer, said product comprising:

computer-readable program code means for causing the client computer to load an operating system from the local storage device or the server computer;

computer-readable program code means for causing the client computer to determine whether the client computer is connected to a LAN and whether a user has an ownership of the local storage device, and to select one of the first and second operation modes in accordance with whether the client computer is connected to the LAN and whether the user has the ownership of the local storage device;

computer-readable program code means for causing the client computer to operate in the selected operation mode; and computer-readable program code means for causing the client computer to display an indicator representing the selected operation mode on a screen of the client computer.

\* \* \* \* \*

UNITED STATES PATENT AND TRADEMARK OFFICE
CERTIFICATE OF CORRECTION

PATENT NO.    : 6,175,918 B1
DATED         : January 16, 2001
INVENTOR(S)   : Nobuo Shimizu It is certified that error appears in the above-identified patent and that said Letters Patent is hereby corrected as shown below:

Column 13, claim 16,
Line 37, after "server computer" insert a comma -- , --.

Column 16, claim 33,
Line 40, after "public network", insert a comma -- , --.

Signed and Sealed this

Twenty-sixth Day of March, 2002

Attest:

JAMES E. ROGAN
Attesting Officer  Director of the United States Patent and Trademark Office